United States Patent

Novosel et al.

[11] Patent Number: 5,956,220
[45] Date of Patent: Sep. 21, 1999

[54] ADAPTIVE DISTANCE PROTECTION SYSTEM

[75] Inventors: Damir Novosel; Yi Hu, both of Cary, N.C.; Murari M. Saha, Västerås, Sweden

[73] Assignees: ABB Power T&D Company Inc., Raleigh, N.C.; ABB Network Partner AB, Västerås, Sweden

[21] Appl. No.: 09/019,321
[22] Filed: Feb. 5, 1998
[51] Int. Cl.⁶ .................................. H02H 3/00
[52] U.S. Cl. .................. 361/62; 361/63; 361/65; 361/80; 361/115
[58] Field of Search ............... 361/62, 63, 64, 361/65, 78, 80, 115

[56] References Cited

U.S. PATENT DOCUMENTS 5,796,258  8/1998  Yang ........................... 361/80

OTHER PUBLICATIONS

Jongepier et al., "Adaptive Distance Protection of a Double-Circuit Line", *IEEE Trans. Power Del.*, 1994, 9(3), 1289–1295.

*Primary Examiner*—Jeffrey Gaffin
*Assistant Examiner*—Stephen Jackson
*Attorney, Agent, or Firm*—Woodcock Washburn Kurtz Mackiewicz & Norris, LLP

[57] ABSTRACT

An adaptive distance relaying system provides improved performance for parallel circuit distance protection. The system utilizes the parallel circuit's current, when available, in conjunction with measurements of voltage and current on the protected line to compensate for the zero sequence current mutual coupling effect. The sequence current ratio (zero or negative sequence) is used to avoid incorrect compensation for relays on the healthy circuit. If the parallel circuit current is not available and the line operating status is, the best zero sequence current compensation factors are selected accordingly as a next level adaptation. If both the parallel circuit current and line operating status are unavailable, a fallback scheme that offers better results than classical distance protection schemes is employed.

12 Claims, 6 Drawing Sheets

POSITIVE, NEGATIVE AND ZERO SEQUENCE NETWORKS
CONNECTION FOR THE PARALLEL LINES

ZERO SEQUENCE NETWORK FOR THE CASE OF THE PARALLEL LINE
SWITCHED-OFF AND GROUNDED AT BOTH ENDS

ADAPTIVE DISTANCE PROTECTION SYSTEM

FIELD OF THE INVENTION

The present invention relates generally to the field of protective relaying, and more particularly to an adaptive distance protection system.

BACKGROUND OF THE INVENTION

The well-known principles underlying distance relaying are that the impedance measured by a relay is proportional to the distance between the relay and a fault on the protected line segment, and that, by measuring the impedance, one can determine whether or not the line is faulted. Distance protection systems have been applied extensively because (a) they can work with only local voltage and current measurements; (b) they can be used in various pilot protection schemes when a communication channel is available; and (c) they can provide coordinated backup protection for adjacent lines. The estimated fault location can be distorted, however, by inaccurate measuring devices and line parameter settings, and by zone settings that become inappropriate due to the dynamic nature of the power system (e.g., the original zone settings may need to be adjusted in view of changes in the load, generator and system topology).

Mutual Coupling in Parallel Circuits

The successful use of distance protection systems in connection with parallel circuits is limited by mutual coupling effects associated with, e.g., a double-circuit line. Known distance protection systems are designed to protect single transmission lines using only a fixed setting for each zone, which means that they only measure the voltage and current of one line, or circuit, and they do not correctly compensate for mutual coupling under all operating conditions. One reason for the difficulty in correctly compensating for mutual coupling is that the amount of such coupling will depend on the configuration of the two circuits, i.e., whether they are switched on or off and whether they are grounded or not. (Of course, there would be no mutual coupling if both lines are switched off.)

The mutual coupling effect is a function of the impedance parameters of the parallel circuits, the fault location, the outside network configuration, and any changes in the load and generator impedances. If the fault current and parallel circuit current flow in the same direction, the apparent impedance will be overestimated and the distance relay will underreach. On the other hand, if the fault current and the parallel circuit current flow in opposite directions, the apparent impedance will be underestimated and the distance relay will overreach. The common practice is to set each relay's reach on the basis of the predicted worst case system conditions for the particular pilot or non-pilot protection scheme in use. However, during other system operating conditions, these settings may degrade the selectivity, security, dependability, and effective speed of the distance protection system.

For example, to avoid overreach for "Zone 1" (Zone 1 typically covers less than 100% of the line and is used for fast tripping of the fault with no time delay), the selected zone setting must be based on the worst case condition, i.e., the parallel circuit switched off and grounded at both ends. This results in reduced Zone 1 coverage under other parallel circuit operating conditions, particularly when both lines are operating. The problem is illustrated in A. G. Jongepier and L. van der Sluis, *Adaptive Protection of a Double-Circuit Line,* IEEE Summer Meeting, paper 93 SM 381-4 PWRD, Vancouver, Canada, July 1993. If an 85% single line protection Zone 1 setting is used, the existing distance protection system will protect only 75% of the circuit when both parallel circuits are in service, while it will cover more than 100% of the circuit when one circuit is switched off and grounded at both ends. A setting much less than 85% must be used to avoid overreach under the "one circuit switched off and grounded at both ends" condition, but this setting will result in much less than 75% of the circuit being protected by the Zone 1 setting of the relay when both circuits are in operation.

On the other hand, to avoid underreach for Zone 2 or Zone 3 settings, the zone settings must be selected based on a different worst case condition, i.e., both lines in operation. This results in a much extended Zone 2 or Zone 3 coverage under other parallel circuit operating conditions, particularly when one parallel circuit is switched off and grounded at both ends, which in turn may cause problems in proper relay coordination. (Overreaching extends Zones 2 and 3 beyond their intended reach, which causes problems with coordination among relays of adjacent lines.)

In view of the problems discussed above, there is a recognized, long-felt need for an adaptive distance protection system that provides improved power system protection. One attempt at providing an adaptive distance protection scheme for parallel circuits is illustrated by Jongepier and van der Sluis in *Adaptive Protection of a Double-Circuit Line,* cited above. This scheme employs a correction factor to compensate for the mutual coupling of the two circuits at the desired setting boundary. The paper suggests computing the correction factor with a substation computer of a "Hierarchical Integrated Protection and Control System." The disclosed scheme requires the use of communication means to link the distance relays to the substation computer. When the link is lost, the worst case settings are used as a fallback solution, and therefore the substation computer must remain available for this approach to work. If the substation computer is not available, the cost of installing a dedicated system for this purpose will be prohibitive. Moreover, the paper does not consider whether the application of such a scheme will pose problems in connection with the healthy circuit.

SUMMARY OF THE INVENTION

The present invention provides an adaptive solution to overcome the problems described above. The invention correctly compensates for mutual coupling effects and avoids incorrect compensation for faults that are not on the protected circuit whenever the parallel circuit's current is accessible. A compensation factor "$k_0$" is automatically adjusted to accommodate the mutual coupling effect when the parallel circuit's current is not accessible but its operating status is known. The system employs a built-in fallback scheme when both the parallel circuit's current and operating status are unknown.

One embodiment of the present invention provides an adaptive distance protection method for use with an underreaching relay in a power system comprising a protected circuit and a parallel circuit. The protected and parallel circuits are connected in parallel between a first bus (G) and a second bus (H), and the underreaching relay comprises current and voltage measuring devices for measuring currents and voltages on the protected circuit. One presently preferred embodiment of the method comprises the steps of:

(A) determining whether a measurement of current in the parallel circuit is available and, if so:
  (A1) calculating a blocking criterion ($\alpha_0$ or $\alpha_2$);
  (A2) determining whether the blocking criterion ($\alpha_0$ or $\alpha_2$) is less than a predefined default value;
  (A3) if the blocking criterion is less than the default value, computing a compensated fault current using the zero sequence current ($I_{Psf0}$) in the parallel circuit;
  (A4) if the blocking criterion is not less than the default value, computing the compensated fault current using a first zero sequence current compensation factor;
(B) if the current measurement in the parallel circuit is unavailable:
  (B1) determining whether an operating status of the parallel circuit is available and, if so, whether the protected and parallel circuits are in operation;
  (B2) if the parallel circuit's operating status is available and both circuits are in operation, calculating a compensated fault current using a second zero sequence current compensation factor;
  (B3) if the parallel circuit's operating status is unavailable, calculating the compensated fault current using a third zero sequence compensation factor;
  (B4) if the parallel circuit's operating status is available and one line is not in operation, calculating the compensated fault current using a fourth zero sequence compensation factor; and
(C) calculating an apparent impedance value $Z_{apparent}$.

Another embodiment of the present invention provides an adaptive distance protection method for use with an over-reaching relay. A preferred embodiment of this method comprises the steps of:
(A) determining whether a measurement of current in the parallel circuit is available and, if so:
  (A1) calculating a blocking criterion ($\alpha_0$ or $\alpha_2$);
  (A2) determining whether the blocking criterion ($\alpha_0$ or $\alpha_2$) is less than a predefined default value;
  (A3) if the blocking criterion is less than the predefined default value, computing a compensated fault current using the zero sequence current ($I_{Psf0}$) in the parallel circuit;
  (A4) if the blocking criterion is not less than the predefined default value, calculating a compensated fault current using a first zero sequence current compensation factor;
(B) if the current measurement is unavailable:
  (B1) determining whether an operating status of the parallel circuit is available and, if so, whether the protected and parallel circuits are in operation;
  (B2) if the parallel circuit's operating status is available and both circuits are in operation, calculating a compensated fault current using a second zero sequence current compensation factor;
  (B3) if the parallel circuit's operating status is unavailable, calculating the compensated fault current using a third zero sequence compensation factor;
  (B4) if the parallel circuit's operating status is available and at least one line is not in operation, calculating the compensated fault current using a fourth zero sequence compensation factor; and
(C) calculating an apparent impedance value $Z_{apparent}$.

In either of the above-summarized embodiments of the invention, the first, second, third and fourth compensation factors may be different from one another or, alternatively, at least two of them may be the same as one another.

Other features of the present invention are disclosed below.

DETAILED DESCRIPTION OF PREFERRED EMBODIMENTS

As discussed above, parallel circuits introduce mutual coupling into the distance protection impedance calculation. The effect of such mutual coupling depends on a number of factors, such as fault location, remote infeed (i.e., contributions of lines connected to a substation bus), and fault resistance. The discussion below analyzes the effect of mutual coupling under various circuit conditions, and then describes presently preferred embodiments of inventive solutions for overcoming the mutual coupling problem. In the following discussion, the expression "protected circuit" refers to the 3-phase circuit 13 (see FIG. 1), since the analysis is being done from the perspective of the relay 1 protecting that circuit, and "parallel circuit" refers to circuit 15.

Figure 1:
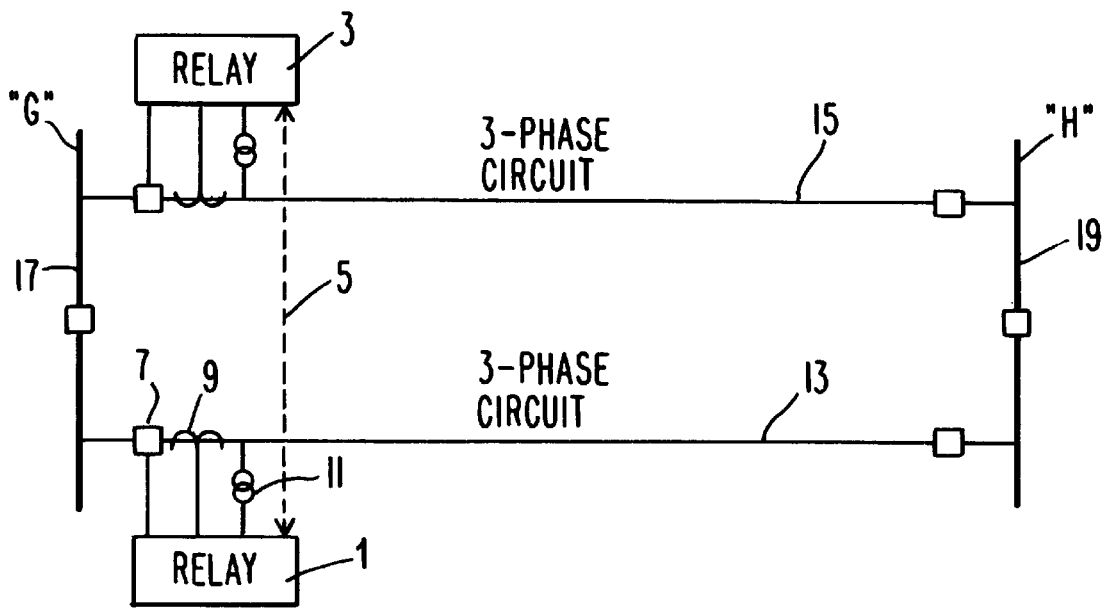
FIG. 1 schematically illustrates a preferred application of an adaptive distance relay.

FIG. 1 depicts the general environment in which the present invention is intended to operate. As shown, the overall system includes relays 1 and 3; a communications link 5 between the two relays; a circuit breaker 7 coupled to relay 1 (other circuit breakers are also present in the system); and a current transformer 9 and a voltage transformer 11 for use by relay 1 in obtaining current and voltage measurements for the protected line segment. Relay 1 is employed to protect 3-phase circuit 13, and relay 3 is used to protect parallel circuit 15. Typically, the relays and circuit breakers are 3-phase devices in that each one is used for all three phases (phases a, b and c) of the circuit to which it is connected. As shown in FIG. 1, each of the 3-phase circuits is connected at one end to a first bus 17 (also referred to as bus "G") and at the other end to a second bus 19 (bus "H").

Figure 2:
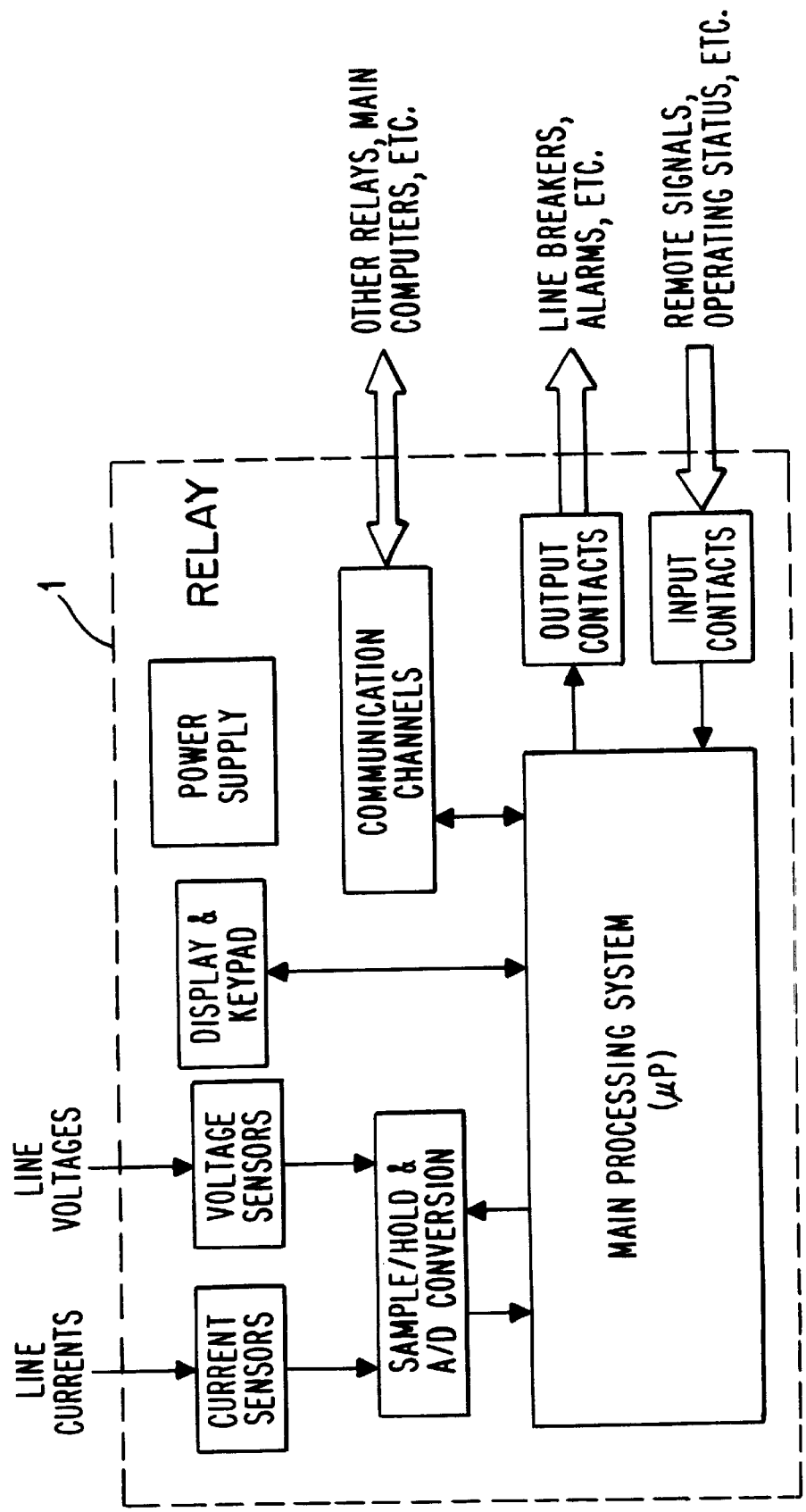
FIG. 2 schematically depicts the principal elements of an adaptive relay that is programmable to operate in accordance with the present invention.

FIG. 2 depicts one presently preferred embodiment of a microprocessor-based protective relay. As shown, the relay comprises current and voltage sensors, sample and hold and analog-to-digital conversion circuitry, a main processing system (preferably microprocessor and/or DSP-based), a display and keypad, a power supply, communication channel (s) and input and output contacts. The circuitry is generally well known. It is mainly the manner in which it is programmed that distinguishes the present invention from the prior art. Those skilled in the art will recognize that the output of the analog-to-digital converter circuitry is fed to the main processor, which employs a cosine filter, Fourier transform, and the like, to produce phasor data for each of the sampled lines. The main processing system preferably includes a microprocessor, random access memory (RAM), and read only memory (ROM), the latter containing program code for controlling the microprocessor in performing fault detection (including fault type determination and fault direction and fault distance determination), fault location, reporting, and other protective relaying, monitoring and control functions. The RAM may include segments of memory for pre-fault data and post-fault data, which may be employed in performing various protective relaying functions. The relay may output fault data to a protection/alarming system (not shown) that performs protection and alarming functions such as tripping a circuit breaker or sounding an alarm as appropriate.

Figure 3:
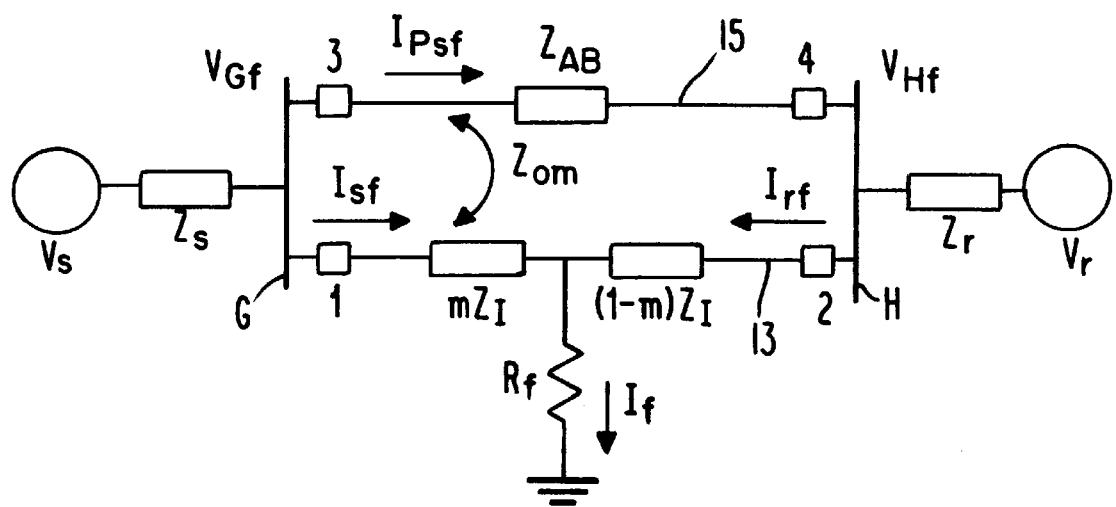
FIG. 3 is a single line diagram illustrating the influence of mutual coupling on parallel circuits.

A single-line diagram of a system with a fault (with a fault resistance $R_f$) on one of the parallel circuits, between buses G and H is shown in FIG. 3. The parts of the system behind the local and remote busses (G and H) have been replaced with their Thévenin equivalents. The table below provides definitions for the various terms used in the following discussion.

$I^c_{sfa}$: Compensated post-fault phase current $V_{Gf}$: Measured post-fault voltage at bus G $V_{Hf}$: Measured post-fault voltage at bus H $V_s$: Source voltage at bus G $V_r$: Source voltage at bus H $I_{sf}$: Measured post-fault current at bus G $I_{Psf}$: Measured post-fault, parallel circuit current at bus G $I_{rf}$: Measured post-fault current at bus H $Z_{l1}$: Line impedance per unit length in protected circuit 13

$Z_{0M}$: Zero sequence mutual coupling between protected circuit 13 and parallel circuit 15

$Z_{AB}$: Line impedance in parallel circuit 15

$Z_s$: Source impedance at bus G $Z_r$: Source impedance at bus H $R_f$: Fault resistance m: Relay-to-fault reach (distance) on a scale of 0–1.

In general, the subscripts 1, 2, and 0 refer to positive, negative and zero sequence components, respectively, in accordance with conventional notation. In addition, the subscript a, b and c refer to the three phases of the transmission lines. For example, $I^c_{sfa}$ refers to the compensated fault current in phase a at the sending or "s" side of the circuit.

For a three-conductor circuit, an additional zero sequence term is used in the typical impedance calculation for ground faults. If compensation for mutual coupling has not been taken into consideration, the fault current at the relay location is compensated with the zero sequence current for the single line-to-ground fault (e.g., a–g fault) as follows:

$$I^c_{sfa} = I_{sfa} + k_0 * I_{sf0} \qquad (1)$$

The zero sequence current compensation factor $k_0$ is:

$$k_0 = (Z_{l0} - Z_{l1})/Z_{l1} \qquad (2)$$

where $Z_{l0}$ and $Z_{l1}$ are zero and positive sequence line impedances, respectively. The apparent impedance to the fault is determined as:

$$Z_{apparent} = V_{Gf}/I^c_{sfa} \qquad (3)$$

where $V_{Gf}$ is the voltage at relay 1 (i.e., the voltage at bus G). The above equations are used in distance relays for three phase, single circuit applications.

We now consider the impact of mutual coupling on the impedance calculation when the fault is on the parallel circuit 15. From FIG. 3, we see that the relay 1 at bus G underreaches (current $I_{Psf0}$ flows in the same direction as current $I_{sf0}$) and the relay 2 at bus H overreaches (current $I_{Psf0}$ flows in the opposite direction to current $I_{rf0}$). The adaptive method is based on current compensation with the zero sequence current in the parallel circuit, $I_{Psf0}$. Thus, in phase a, the compensated fault current at relay 1 (for a single-line-to-ground, a–g, fault) is:

$$I^F_{sfa}32\, I_{sfa} + [(Z_{l0}-Z_{l1})/Z_{l1}]*I_{sf0} + [Z_{0M}/Z_{l1}]*I_{Psf0} \qquad (4)$$

where $Z_{0M}$ is the total uniform zero sequence mutual impedance between the parallel circuits 13, 15. However, the current $I_{Psf0}$ may not always be accessible and may adversely affect the impedance measurement if the fault is on the parallel circuit 15. The value of the apparent impedance measured by relay 1 at terminal G, for the phase a-to-ground (a–g) fault and with fully compensated current, is:

$$Z_{G1} = V_{Gfa}/I^F_{sfa} = (mZ_{l1}*I^F_{sfa} + R_f*I_f)/I^F_{sfa} = mZ_{l1} + R_f*(I_f/I^F_{sfa}) \qquad (5)$$

The distance protection system on the healthy parallel circuit may operate incorrectly if inappropriate mutual coupling compensation has been implemented. If the distance protection system at relay 3 in FIG. 3 has been compensated with the zero sequence current in the parallel circuit as in equation (4), false overreaches may occur for the faults close to terminal G. How far from G (toward H) false overreach may occur depends on the actual network conditions and relay settings. Misoperation of the relay on the healthy circuit will occur for the case of compensation with the zero sequence current in the parallel circuit. If no compensation for mutual coupling is used, the distance relay will underreach, but the underreach will not cause relay misoperation. Thus, compensation with the zero sequence current in the parallel circuit should be blocked, and no compensation is needed for the relay on the healthy circuit.

With the fault on the adjacent circuit, remote substation infeed and parallel circuit current introduce errors in the impedance calculation even if the compensation for mutual coupling is correct. When the fault is on the protected circuit, apparent impedance can be calculated correctly if mutual coupling compensation with the zero sequence current in the parallel circuit is applied. This current, if not accessible, can be calculated from the zero sequence current in the faulted line if the zero sequence source impedance is available. However, since the zero sequence source impedance is not reliable, other means for compensating for this current are needed.

The following discussion explains how the zero sequence current in the parallel circuit may be calculated and then related to the zero sequence current in the faulted circuit for various system conditions. A ratio of the sequence currents in the parallel circuit is later used for blocking of the compensation when the protected circuit 11 is healthy. Appropriate means for compensating for the mutual coupling are also examined. Adaptive protection schemes can utilize the different compensation factors for various system conditions to improve the accuracy of the impedance calculation.

For a typical three-conductor circuit, a zero sequence term $k_0$ (equation 2) is used in the impedance calculation. If the zero sequence current in the parallel circuit is not available, the correction for mutual coupling may be compensated for in a similar manner. This is done either by adjusting the compensation factor $k_0$ or by changing the relay settings.

Figure 4:
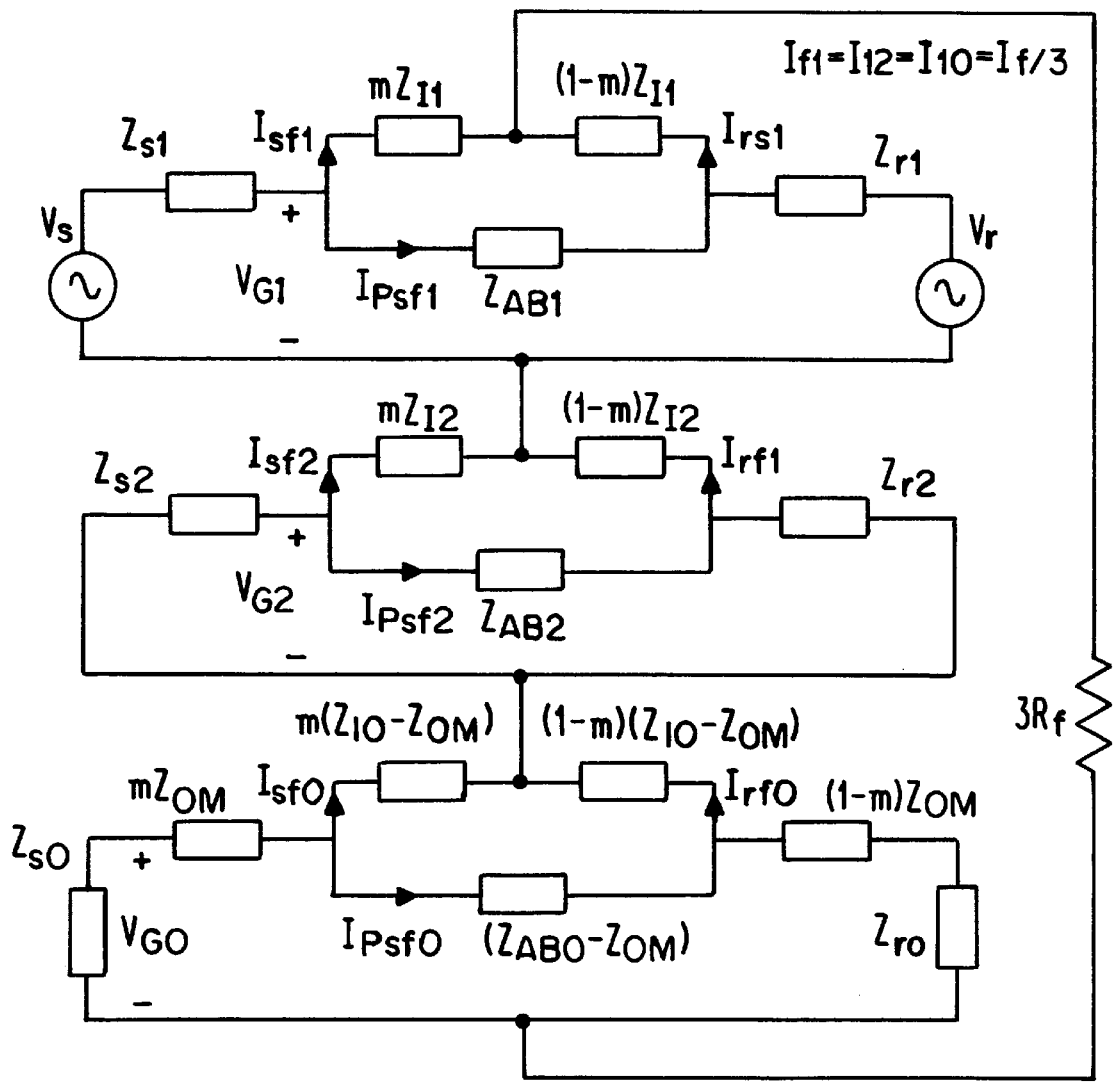
FIG. 4 illustrates the connection of positive, negative and zero sequence networks for parallel circuits.

The connection of positive, negative and zero sequence networks, when both circuits are in operation, is shown in FIG. 4. From FIG. 4, it can be seen that the zero sequence current distribution factor $d_{s0}$ is:

$$d_{s0}=I_{sf0}/I_{f0}=([Z_{r0}^M+(1-m)Z_{I0}^M]Z_{AB0}^M+(Z_{s0}^M+Z_{r0}^M)Z_{I0}^M(1-m))/((Z_{s0}^M+Z_{r0}^M+Z_{I0}^M)Z_{AB0}^M+Z_{I0}^M(Z_{S0}^M+Z_{r0}^M)) \quad (6)$$

where $$Z_{s0}^M = Z_{s0} + mZ_{0M} \quad (7)$$

$$Z_{r0}^M = Z_{r0} + (1-m)Z_{0M}$$

$$Z_{AB0}^M = Z_{AB0} - Z_{0M}$$

$$Z_{10}^M = Z_{10} - Z_{0M}$$

If we assume $Z_{AB0}=Z_{I0}$ and by using equation (6) it follows that:

$$d_{s0}=I_{sf0}/I_{f0}=(Z_{r0}^M+(1-m)(Z_{S0}^M+Z_{r0}^M+Z_{10}^M))/(2(Z_{S0}^M+Z_{r0}^M)+Z_{I0}^M), \quad (8)$$

From FIG. 4:

$$I_{sf0}*mZ_{I0}^M=I_{rf0}*(1-m)Z_{I0}^M+I_{Psf0}*Z_{I0}^M \quad (9)$$

By using equations (8) and (9), and $I_{rf0}=I_{f0}-I_{sf0}$, the equation for the zero sequence current in the parallel circuit may be derived as:

$$I_{Psf0}=[(mZ_{r0}-(1-m)Z_{s0})/((2-m)Z_{r0}+(1-m)(Z_{s0}+Z_{I0}+Z_{0M}))]*I_{sf0} \quad (10)$$

Thus, the zero sequence current in the parallel circuit depends on the fault location and Thévénin source impedances. The equation for $I_{Psf0}$, if $Z_{AB0}{\neq}Z_{I0}$, can be easily derived.

When both circuits are in operation and the fault is on the adjacent circuit (i.e., an immediately neighboring line), underreach is most severe since the fault current and the parallel circuit current flow in the same direction throughout the whole line length. When the fault is on the protected line, the direction of the parallel circuit's zero sequence current depends on the zero sequence source impedances and fault location. In any case, the distance relay may not be able to detect faults that are inside the protected zone and may fail to operate if the fault current and the parallel circuit current flow in the same direction. It is clear that critical cases are where the fault is just inside the zone boundary. Thus, if mutual coupling compensation is not performed, the mutual coupling effect reduces the reach of the distance relay.

The zero sequence current in the parallel circuit, $I_{Psf0}$, is available at the substation and can be compensated for by equation (4). If this current is not accessible, the relays can be set by adjusting the compensation factor $k_0$. If the parallel circuits have equal parameters and the fault is at or beyond the remote terminal, by using equation (4) and assuming $I_{sf0}=I_{Psf0}$, it follows that a compensation factor including compensation for mutual coupling may be calculated as:

$$k_0'=(Z_{I0}-Z_{I1}+Z_{0M})/Z_{I1} \quad (11)$$

The approximate compensation factor $k_0'$ has been used instead of $k_0$ in equation (2) to compensate for the underreach effect of mutual coupling for Zone 2 of distance relays (or overreaching schemes). However, if the effect of mutual coupling is to cause overreach (e.g., parallel circuit switched-off and grounded), this compensation will increase overreach. In this case, excessive overreach may cause selectivity problems.

The following discussion explains how to calculate the zero sequence current in the parallel circuit and to relate this current to the zero sequence current in the faulted circuit where one line is switched-off and grounded. The appropriate compensation factor for this case is also derived.

Figure 5:
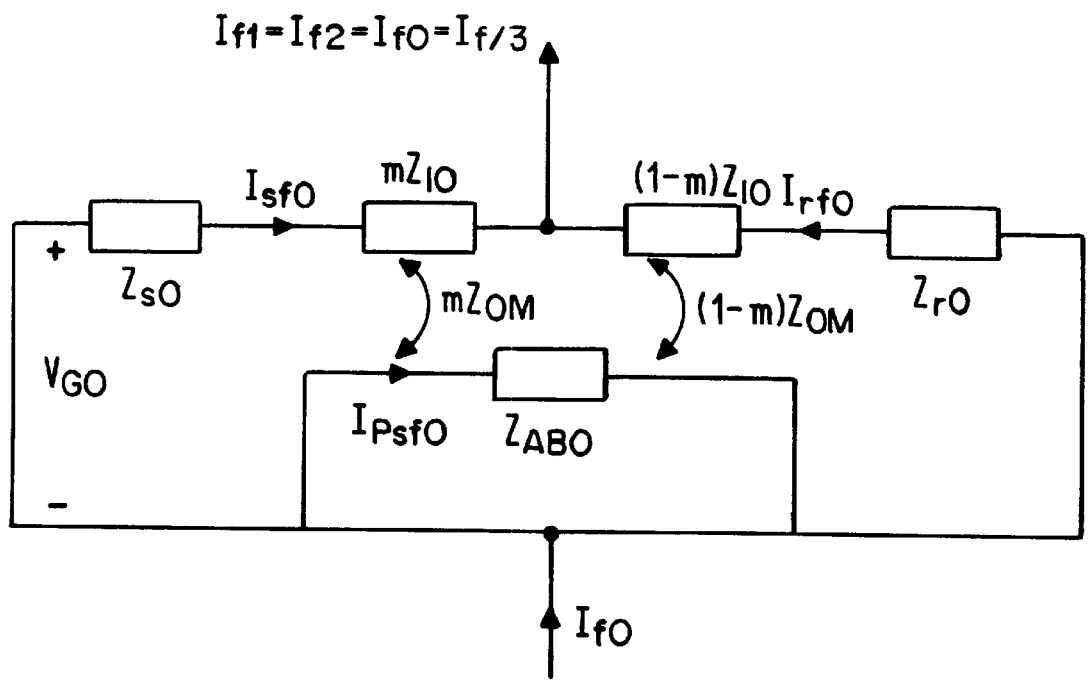
FIG. 5 illustrates a zero sequence network for the case of the parallel circuit being switched off and grounded at both ends.

A zero sequence network for the case of where the parallel circuit is switched-off and grounded is shown in FIG. 5. This drawing depicts a model used to represent the zero sequence current in the parallel circuit with the zero sequence current in the faulted line.

If we assume $Z_{AB0}=Z_{I0}$, it follows that:

$$I_{Psf0}*Z_{I0}=-mZ_{0M}*I_{sf0}+(1-m)Z_{0M}*I_{rf0} \quad (12)$$

$$I_{rf0}*[Z_{r0}+(1-m)Z_{I0}]=(mZ_{10}+Z_{s0})*I_{sF0}+Z_{0M}*I_{Psf0} \quad (13)$$

Combining equations (12) and (13), the zero sequence current in the parallel circuit is:

$$I_{Psf0}=[(Z_{0M}[(1-m)Z_{s0}-mZ_{r0}])/(Z_{I0}[1-m)Z_{I0}+Z_{r0}-(1-m)Z^2_{0M}])]*I_{sf0} \quad (14)$$

Again, the zero sequence current in the parallel circuit depends on the fault location and Thévénin source impedances. The equation for $I_{Psf0}$, if $Z_{AB0}{\neq}Z_{I0}$, can be easily derived.

The current $I_{Psf0}$ can be measured only if the current transformers are on the line side of the point at which the ground is made, but this may not be desirable due to security reasons. In this case, the relays can be set by adjusting the compensation factor $k_0$. An appropriate compensation factor for this case is derived below.

From equation (14), for the fault at (m=1) or beyond the remote terminal, it follows that $$I_{Psf0}=-(Z_{0M}/Z_{AB0})*I_{sf0}.$$

The compensated fault current (for an a–g fault) should be:

$$I^F_{sfa}=I_{sfa}+((Z_{I0}-Z_{I1})/Z_{I1}-Z^2_{0M}/(Z_{I1}*Z_{AB0}))*I_{sf0}) \quad (15)$$

From equation (15), it follows that a compensation factor $k_0''$, that includes mutual coupling compensation, for the case of the parallel circuit being switched-off and grounded at both ends, is:

$$k_0''=((Z_{I0}-Z_{I1})/Z_{I1}-Z^2_{0M}/(Z_{I1}*Z_{AB0}))=(Z_{I0}*Z_{AB0}-Z_{I1}*Z_{AB0}-Z^2_{0M}/(Z_{I1}*Z_{AB0})) \quad (16)$$

The approximate compensation factor $k_0''$ has been used instead of $k_0$ to compensate for the overreach effect of mutual coupling for Zone 1 of distance relays or underreaching schemes. Using compensation for this case, selectivity of the distance protection system will be achieved for any other system conditions because the relay will underreach. However, if the effect of mutual coupling is to cause underreach (e.g., both lines in operation), this compensation will further increase underreach and a considerably smaller part of the line may be covered.

In conclusion, the distance relay operation is suboptimal if compensation with the factor $k_0''$ is used without adapting to the actual system conditions.

If the fault is not very close to the remote end, accurate mutual compensation will be a function of the fault location and the remote infeed current. Thus, in addition to the fault location, either accurate values of the source impedances or the remote infeed current are needed for accurate compensation.

Flowcharts for Underreaching and Overreaching Zones

Figure 6:
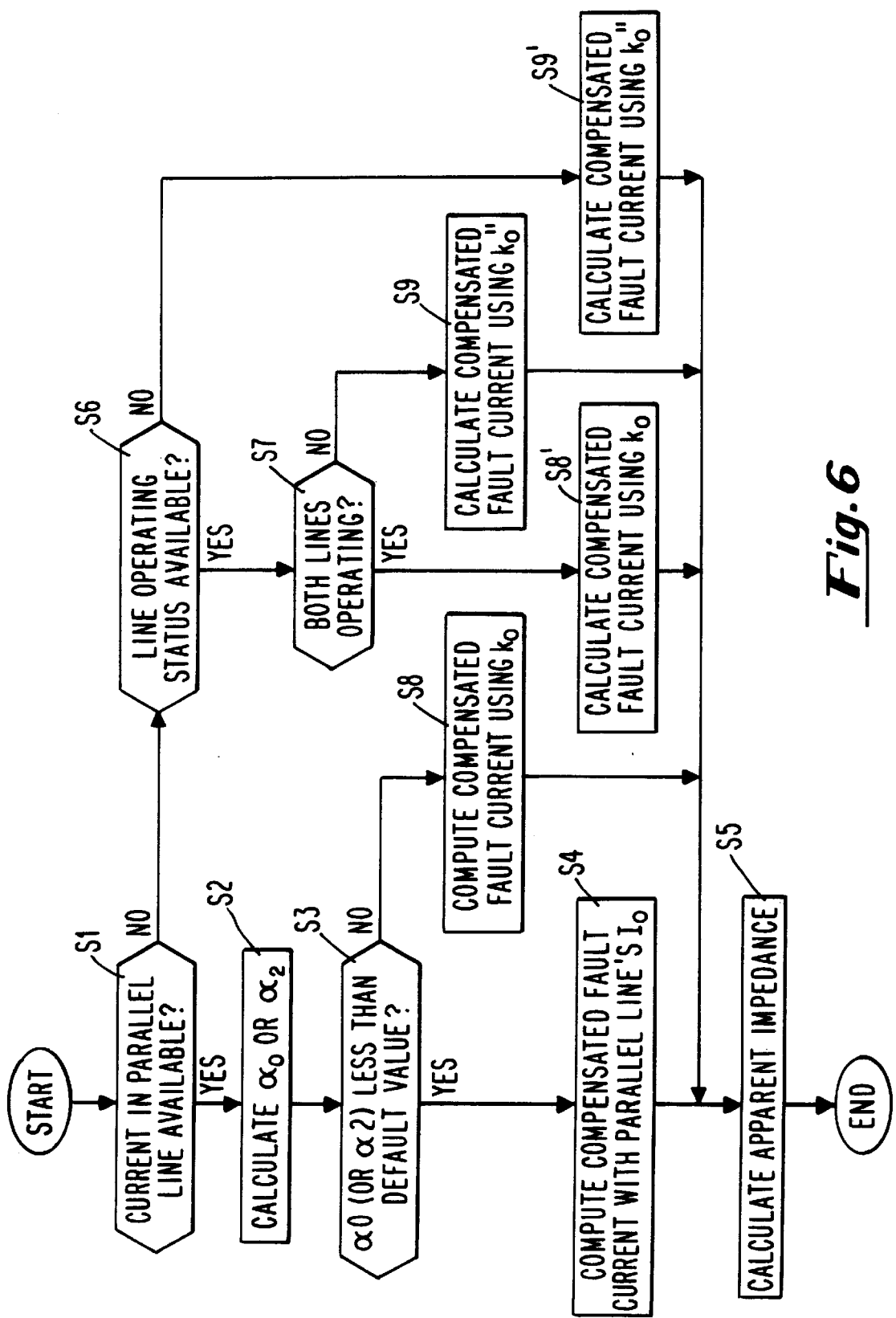
FIG. 6 is a flowchart of a presently preferred implementation of an adaptive distance protection system for Zone 1, or underreaching, schemes in accordance with the present invention.
Figure 7:
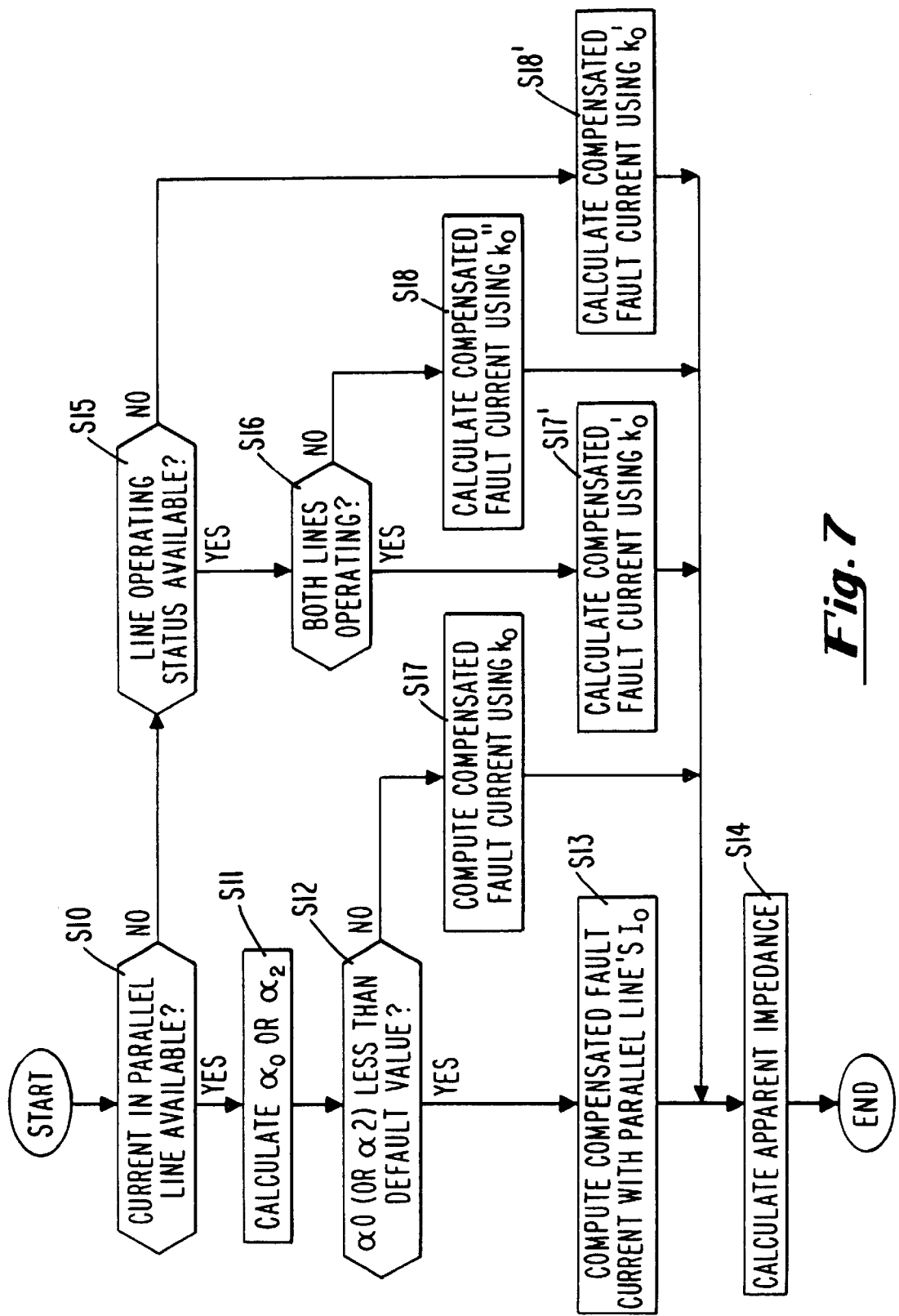
FIG. 7 is a flowchart of a presently preferred implementation of an adaptive distance protection scheme for Zones 2/3, or overreaching, schemes in accordance with the present invention.

FIGS. 6 and 7 are exemplary flowcharts for the adaptive distance measurement system disclosed herein. The flowchart in FIG. 6 is for Zone 1, or underreach zones, of distance relays, while the flow-chart in FIG. 7 is for Zone 2/3, or overreach zones of distance relays. Various adaptive distance measurement levels are embedded in the system. The first adaptive level is to use the parallel circuit's current in conjunction with the protected line's voltage and current to correctly compensate for the mutual coupling effect. The problem of the healthy relay overreaching when the fault is on the parallel circuit has been solved by calculation of a blocking criterion $\alpha$. The blocking criterion is the ratio of the negative or zero sequence currents in the parallel circuits. This criterion is defined and analyzed in greater detail below.

The next adaptive level is to automatically accommodate the mutual coupling effect for the actual system state by the appropriate faulted current compensation factor, $k_0$, in the current calculation for different relay settings for different distance protection zones and pilot schemes. The methods embodied in the flowcharts of FIGS. 6 and 7 use an appropriate faulted current compensation factor $k_0$ in the current calculation. No high-speed communications and/or SCADA data are required for this level. The only information communicated should be that the parallel circuit is switched-off and grounded at both ends.

If information on the state of the remote ground of the switched-off, serviced parallel circuit is not available or reliable, a fallback position is implemented. The fallback position is achieved by compensation with the factor $k_0''$ for Zone 1 and underreaching schemes of the distance relays. Zones 2 and 3 and overreaching schemes need to use $k_0'$ for dependability reasons. For example, Zone 2 or overreaching schemes have to cover the remote terminal in any case, and undesired mutual coupling compensation with $k_0''$ (if the parallel circuit is not switched-off and grounded at both ends) will reduce the reach considerably. The relay may therefore fail to operate, which must be avoided.

Thus, if any of the information that will allow for adaptive protection is not available, the fallback position is still better than the classical distance protection method, since Zone 1 and Zone 2 use different faulted current compensation factors.

Referring to FIG. 6, the presently preferred process for use with Zone 1 or underreaching schemes begins at step S1, where the relay determines whether the current in the parallel circuit is available. If so, $\alpha_0$ or $\alpha_2$ is calculated at step S2. Next, at step S3, the relay determines whether $\alpha_0$ or $\alpha_2$ is less than a predefined default value (e.g., 2.0); and, if so, the relay compensates for mutual coupling at step S4 with the parallel circuit's zero sequence current. Finally, at step S5, the apparent impedance is calculated.

If, at step S1, the relay finds that the parallel circuit current is unavailable, it determines at step S6 whether the parallel circuit's operating status is available, and at step S7 whether both circuits are in operation. If the answer to both queries is yes, the compensated fault current is calculated in step S8' using $k_0$, which may be the same as or different from the $k_0$ used in step S8, and then the apparent impedance is calculated at step S5. Alternatively, if the parallel circuit's operating status is unavailable or both lines are not in operation, the compensated fault current is calculated in step S9 or S9', respectively, using $k_0''$. Again, the values of $k_0''$ used in steps S9 and S9' may be the same or different, depending on the particular system in which the invention is employed.

As illustrated in FIG. 7, a similar process is employed in connection with Zone 2/3 or overreaching schemes. As shown, the process begins at step S10, where the relay determines whether the current in the parallel circuit is available, and, if so, proceeds to S11 where $\alpha_0$ or $\alpha_2$ is calculated. At step S12, the relay determines whether $\alpha_0$ or $\alpha_2$ is less than a predefined default value, and if so compensates for mutual coupling at step S13 with the parallel circuit's zero sequence current. If $\alpha_0$ or $\alpha_2$ is not less than the default value, the compensated fault current is calculated in step S17 using $k_0$. The apparent impedance is then calculated at step S14. If the parallel circuit current is unavailable, as determined at S10, the relay determines whether the parallel circuit's operating status is available (S15), and whether both circuits are in operation (S16). The compensated fault current is calculated using $k_0$, step S17', if the parallel circuit's operating status is available and both circuits are operating. The apparent impedance is then calculated at step S14. If the parallel circuit's operating status is not available or at least one line is not in operation (per steps S15 and S16), the compensated fault current is calculated using $k_0'$ (S18 or S18'). Again, the values of $k_0'$ used in steps S18 and S18' may be the same or different, depending on the particular system in which the invention is employed.

The blocking criterion $\alpha$ will now be defined.

Blocking Criterion $\alpha$

The possibility that the relay on the healthy circuit may trip undesirably is one of the reasons why compensation with the zero sequence current in the parallel circuit is not often used in practice. The adaptive protection scheme should block compensation for a fault on the other line. This may be accomplished by comparing the currents in the parallel circuits.

The ratio of zero and negative sequence currents in parallel circuits can be used as a criterion for blocking of mutual coupling compensation. From FIG. 4 and equation (10) this ratio in zero sequence is as follows:

$$\alpha_0 = |I_{Psf0}/I_{sf0}| = |(mZ_{r0} - (1-m)Z_{s0})/(2-m)Z_{r0} + (1-m)(Z_{s0} + Z_{l0} + Z_{0M}))| \quad (17)$$

From FIG. 4, the ratio in positive or negative sequence is as follows:

$$\alpha_{1,2} = |I_{Psf1,2}/I_{sf1,2}| = |(mZ_{r1,2} - (1-m)Z_{s1,2})/(2-m)Z_{r1,2} + (1-m)(Z_{s1,2} + Z_{l1,2})| \quad (18)$$

The problem of healthy relay overreach if the fault is on the parallel circuit has been solved by calculation of the blocking criteria $\alpha_2$ and $\alpha_0$. The blocking criterion $\alpha_2$ (equation 18) is the ratio between the negative sequence current in the healthy circuit and the negative sequence current in the faulted line. The blocking criterion $\alpha_0$ (equation 17) is the ratio between zero sequence current in the healthy circuit and the zero sequence current in the faulted line. This ratio has been calculated for terminals G and H.

The value of $\alpha$ approaches unity if the fault is close to terminal H. For faults close to G, the value of $\alpha$ is large (with the absolute value much greater than 1), which could be positive or negative, on the healthy circuit. The relay on the healthy circuit has a larger overreach for faults on the other line closer to the relay terminal (substation G). Thus, preferably, $\alpha$ takes large absolute values for the cases of larger overreach.

In conclusion, an appropriate threshold value of either the ratio $\alpha_0$ of the zero sequence currents in the parallel circuits, the ratio $\alpha_2$ of the negative sequence currents in parallel circuits, or the ratio $\alpha_1$ of the positive sequence currents in parallel circuits can be used as a criterion to block undesirable compensation. This value may be selected by default in the system to avoid any additional relay settings. However, the negative (or positive sequence) blocking criterion $\alpha_2$ is more reliable than the zero sequence blocking criterion $\alpha_0$. Therefore, $\alpha_2$ should be used if available.

In sum, the performance of prior art distance relays, which were designed for single line protection, when used to protect parallel circuits, is adversely affected by the zero sequence current mutual coupling effect, which varies with line operating conditions. The inventive system disclosed herein offers an adaptive approach to provide improved performance for parallel circuit distance protection. The adaptive distance protection system utilizes the parallel circuit's current (when available) in conjunction with measurements of voltage and current on the protected line to compensate for the zero sequence current mutual coupling effect. The invention achieves accurate distance measurements for the faulted line. The sequence current ratio (zero or negative sequence) is used to avoid incorrect compensation for relays on the healthy circuit. If the parallel circuit current is not available and the line operating status is, the best zero sequence current compensation factors are selected accordingly as a next level adaptation. In the event that both the parallel circuit current and line operating status are not available, a fallback scheme embedded in the system is used. The fallback scheme offers better results than the classical distance protection scheme.

The above description of preferred embodiments is not intended to limit the scope of protection of the following claims. Thus, for example, except where they are expressly so limited, the following claims are not limited to applications involving three-phase power systems or power systems employing a 60 Hz fundamental frequency. Moreover, the claims are not limited to protective relays or fault location systems associated with any particular part (i.e., transformer, feeder, high power transmission line, etc.) of a power distribution system.

We claim:

1. An adaptive distance protection method for use with an underreaching relay in a power system comprising a protected circuit and a parallel circuit, wherein said protected and parallel circuits are connected in parallel between a first bus (G) and a second bus (H), and wherein said underreaching relay comprises current and voltage measuring devices for measuring currents and voltages on said protected circuit, comprising the steps of:

(A) determining whether a measurement of current in said parallel circuit is available and, if so:
        (A1) calculating a blocking criterion ($\alpha_0$ or $\alpha_2$);
        (A2) determining whether said blocking criterion ($\alpha_0$ or $\alpha_2$) is less than a predefined default value;
        (A3) if said blocking criterion is less than said default value, computing a compensated fault current using the zero sequence current ($I_{Psf0}$) in said parallel circuit;
        (A4) if said blocking criterion is not less than said default value, computing the compensated fault current using a first zero sequence current compensation factor;

(B) if said current measurement is unavailable:
        (B1) determining whether an operating status of said parallel circuit is available and, if so, whether said protected and parallel circuits are in operation;
        (B2) if the parallel circuit's operating status is available and both circuits are in operation, calculating a compensated fault current using a second zero sequence current compensation factor;
        (B3) if the parallel circuit's operating status is unavailable, calculating the compensated fault current using a third zero sequence compensation factor;
        (B4) if the parallel circuit's operating status is available and one line is not in operation, calculating the compensated fault current using a fourth zero sequence compensation factor; and (C) calculating an apparent impedance value $Z_{apparent}$.

2. A method as recited in claim 1, wherein:

$k_0$ is determined by, $k_0=(Z_{l0}-Z_{l1})/Z_{l1}$, where $Z_{l0}$ and $Z_{l1}$ are zero and positive sequence line impedances, respectively, in said protected circuit;

$k_0''$ is determined by,
   $k_0''=Z_{l0}*Z_{AB0}-Z_{l1}*Z_{AB0}-Z^2_{0M}/(Z_{l1}*Z_{AB0})$;

$\alpha_0$ is a ratio of zero sequence currents in the first and second circuits; and $\alpha_2$ is a ratio of negative sequence currents in the first and second circuits;

wherein $Z_{0M}$ is a zero sequence mutual coupling between the protected circuit and the parallel circuit; and $Z_{AB0}$ is a zero sequence line impedance for the parallel circuit.

3. A method as recited in claim 2, wherein $\alpha_0$ and $\alpha_2$ are determined by:

$\alpha_0=|I_{Psf0}/I_{sf0}|$
   $\alpha_{1,2}=|I_{Psf1,2}/I_{sf1,2}|$;

wherein $I_{sf0}$ is a zero sequence current at bus G; $I_{sf1}$ is a positive sequence current at bus G; $I_{sf2}$ is negative sequence current at but G; $I_{Psf0}$ is a parallel circuit zero sequence current at bus G; $I_{Psf1}$ is a parallel circuit positive sequence current at bus G; and $I_{Psf2}$ is a parallel circuit negative sequence current at bus G.

4. A method as recited in claim 3, wherein $Z_{apparent}$ is determined by $Z_{apparent}=V_{Gf}/I^c_{sfa}$, wherein $I^c_{sfa}$ is compensated post-fault phase current and $V_{Gf}$ is a measured post-fault voltage at bus G.

5. A method as recited in claim 4, wherein said first, second, third and fourth compensation factors are different from one another.

6. A method as recited in claim 4, wherein at least two of said first, second, third and fourth compensation factors are the same as one another.

7. An adaptive distance protection method for use with an overreaching relay in a power system comprising a protected circuit and a parallel circuit, wherein said protected and parallel circuits are connected in parallel between a first bus (G) and a second bus (H), and wherein said overreaching relay comprises current and voltage measuring devices for measuring currents and voltages on said protected circuit, comprising the steps of:

(A) determining whether a measurement of current in said parallel circuit is available and, if so:
        (A1) calculating a blocking criterion ($\alpha_0$ or $\alpha_2$);
        (A2) determining whether said blocking criterion ($\alpha_0$ or $\alpha_2$) is less than a predefined default value;
        (A3) if said blocking criterion is less than said predefined default value, computing a compensated fault current using the zero sequence current ($I_{Psf0}$) in said parallel circuit;

(A4) if said blocking criterion is not less than said predefined default value, calculating a compensated fault current using a first zero sequence current compensation factor;

(B) if said current measurement is unavailable:

(B1) determining whether an operating status of said parallel circuit is available and, if so, whether the protected and parallel circuits are in operation;

(B2) if the parallel circuit's operating status is available and both circuits are in operation, calculating a compensated fault current using a second zero sequence current compensation factor;

(B3) if the parallel circuit's operating status is unavailable, calculating the compensated fault current using a third zero sequence compensation factor;

(B4) if the parallel circuit's operating status is available and at least one line is not in operation, calculating the compensated fault current using a fourth zero sequence compensation factor; and (C) calculating an apparent impedance value $Z_{apparent}$.

8. A method as recited in claim 7, wherein:

$k_0$ is determined by, $k_0 = (Z_{l0} - Z_{l1})/Z_{l1}$, where $Z_{l0}$ and $Z_{l1}$ are zero and positive sequence line impedances, respectively, in said protected circuit;

$k_0'$ is determined by, $K_0' = (Z_{l0-Zl1} + Z_{0M})/Z_{l1}$;

$\alpha_0$ is a ratio of zero sequence currents in the first and second circuits; and $\alpha_2$ is a ratio of negative sequence currents in the first and second circuits;

wherein $Z_{0M}$ is a zero sequence mutual coupling between the protected circuit and the parallel circuit; and $Z_{AB0}$ is a zero sequence line impedance for the parallel circuit.

9. A method as recited in claim 8, wherein $\alpha_0$ and $\alpha_2$ are determined by:

$\alpha_0 = |I_{Psf0}/I_{sf0}|$, $\alpha_{1,2} = |I_{Psf1,2}/I_{sf1,2}|$;

wherein $I_{sf0}$ is a zero sequence current at bus G; $I_{sf1}$ is a positive sequence current at bus G; $I_{sf2}$ is negative sequence current at but G; $I_{Psf0}$ is a parallel circuit zero sequence current at bus G; $I_{Psf1}$ is a parallel circuit positive sequence current at bus G; and $I_{Psf2}$ is a parallel circuit negative sequence current at bus G.

10. A method as recited in claim 9, wherein $Z_{apparent}$ is determined by $Z_{apparent} = V_{Gf}/I^C_{sfa}$, wherein $I^C_{sfa}$ is a compensated post-fault phase current and $V_{Gf}$ is a measured post-fault voltage at bus G.

11. A method as recited in claim 10, wherein said first, second, third and fourth compensation factors are different from one another.

12. A method as recited in claim 10, wherein at least two of said first, second, third and fourth compensation factors are the same as one another.

* * * * *